HENRY BELFIELD.

Improvement in Machines for Cutting the Teeth of Wheels.

No. 120,023. Patented Oct. 17, 1871.

WITNESSES
Jno. B. Harding.
Thos. McIlvain

Henry Belfield
by his Att'y
Horace Austen

UNITED STATES PATENT OFFICE.

HENRY BELFIELD, OF PHILADELPHIA, PENNSYLVANIA.

IMPROVEMENT IN MACHINES FOR CUTTING THE TEETH OF WHEELS.

Specification forming part of Letters Patent No. 120,023, dated October 17, 1871.

*To all whom it may concern:*

Be it known that I, HENRY BELFIELD, of Philadelphia, county of Philadelphia, State of Pennsylvania, have invented a Process of Cutting the Teeth of Wheels, of which the following is a specification:

My invention consists of a machine, fully described hereafter, for expeditiously and accurately cutting the teeth of wheels.

Figure 1:
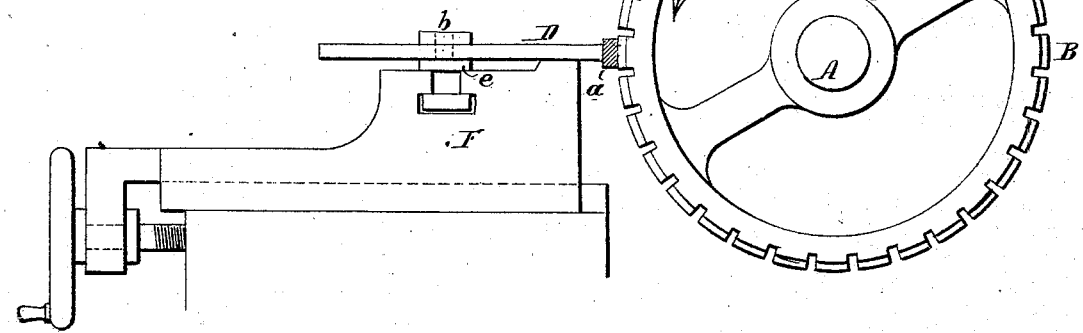
Figure 2:
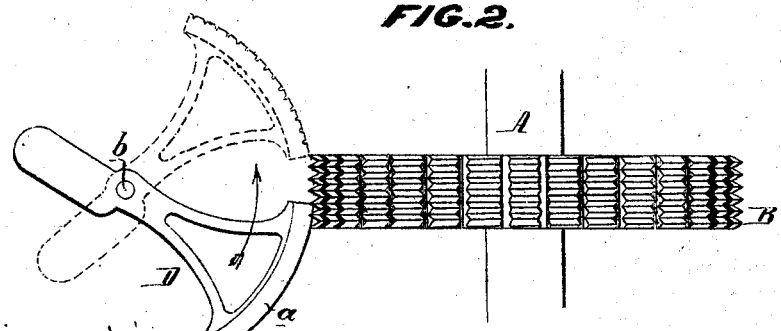
Figure 3:
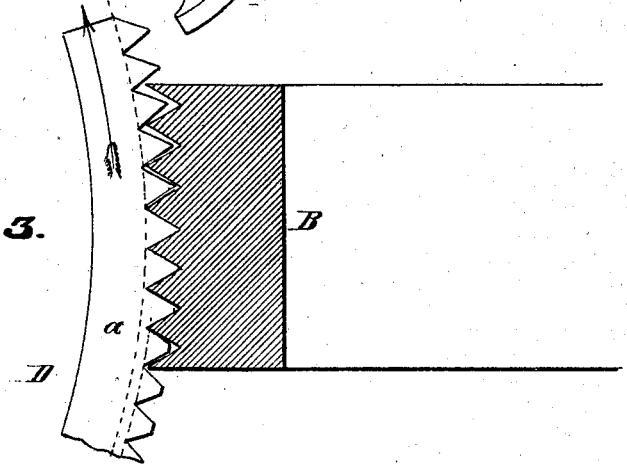
Figure 4:
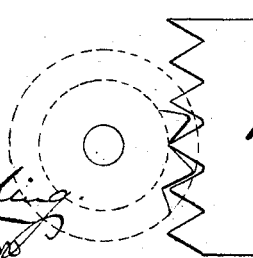

Figure 1 is a side view of my machine for cutting the teeth of wheels; Fig. 2, a plan view of Fig. 1; Fig. 3, a plan view, drawn to an enlarged scale for the better illustration of my invention; Fig. 4, a diagram illustrating the mode of cutting the teeth of small wheels or pinions.

A is a mandrel or spindle, which may be caused to revolve in an ordinary lathe; and to this spindle is secured what is known to machinists as a hub or master—that is, a cylinder or wheel—on the surface or periphery of which is cut a screw-thread, and across which slots are formed at intervals. Such hubs or master-taps are of hardened steel, and are in common use for the purpose of forming ordinary screw-cutting or chasing-tools in a manner too well known to need minute description. The hub B, or, as it may be termed, the cutting-screw, is, in the present instance, narrower than ordinary instruments of this class, and its threads are formed to correspond to the shape of the teeth to be cut.

The object on which the teeth are being cut, as illustrated in the drawing, is a segmental lever, D, such as is used in many steam-gauges, the teeth having to be cut on the periphery of the segment $a$, of which $b$ is the central hole.

To the top slide F of an ordinary slide-rest I attach a pin, $e$, so adapted to the hole $b$ of the segmental lever that the latter can turn freely on the said pin. I then so adjust the slide-rest that the periphery $a$ of the segment is brought in contact with that of the hub B. The consequence of this will be the turning of the segment from the position shown in plain lines to that shown by dotted lines in Fig. 2, and the formation of incipient teeth on the periphery $a$ of the segment, the turning effect being caused by the screw on the hub, and the cutting effect by the transverse cutting-edges formed by the transverse slots on the hub.

The segment being now free from contact with the hub, the slide F is fed slightly forward, and the segment turned around in the direction of the arrow, Fig. 2, and is again submitted to the turning and cutting actions of the hub; and these operations are continued until teeth corresponding in shape to the thread of the hub are cut in the periphery $a$ of the segment.

It will be readily understood that a wheel can have teeth cut entirely around its periphery by the above-described process, the object of selecting a segment to illustrate my invention, in the present instance, being the fact that I have cut teeth on many hundreds of segments precisely like that shown in the drawing by the process described.

When it is desired to cut the teeth of a pinion to accord with those on the segment, all that is necessary is to so place the pinion-blank on the slide F that a fixed pin on the latter will project through the central hole of the blank, and then feed the slide forward until the periphery of the blank is in contact with the hub B. The blank will now revolve, and as it is slowly fed forward the desired teeth will be cut in it by the revolving hub, and these will accord exactly with the teeth cut by the same hub in the segment.

There will of necessity be a concavity corresponding with the circumference of the hub, formed in the edge of the segment, and in that of the pinion, and the teeth must necessarily be inclined in accordance with the inclination of the thread of the hub; but I have found the teeth to be so accurate that I have adopted the above-described process in cutting the delicate gearing of steam-gauges, and have succeeded in obtaining better results as regards uniform movement of the pointers in these instruments than by gearing cut by any other process.

My machine, however, is not restricted in its application to the cutting of the teeth of the small wheels referred to; the teeth of much larger wheels may also be cut; but I prefer in cutting the teeth of large wheels to impart during the cutting process a vertical movement either to the wheel, or to the hub, so that the latter will not form the concavity above referred to in the edge of the wheel.

I claim—

The combination of the adjustable slide F, adapted to receive and retain the blank to be cut, the rotating spindle A, and the wheel B having an external screw-thread and transverse recesses forming a series of serrated cutting-edges, as specified.

In testimony whereof I have signed my name to this specification in the presence of two subscribing witnesses.

H. BELFIELD.

Witnesses:
WM. A. STEEL,
HARRY SMITH.

(100)